H. G. WEEKS.
ELECTRIC COOKING APPARATUS.
APPLICATION FILED MAY 6, 1911.
1,118,454.
Patented Nov. 24, 1914.
4 SHEETS—SHEET 3.
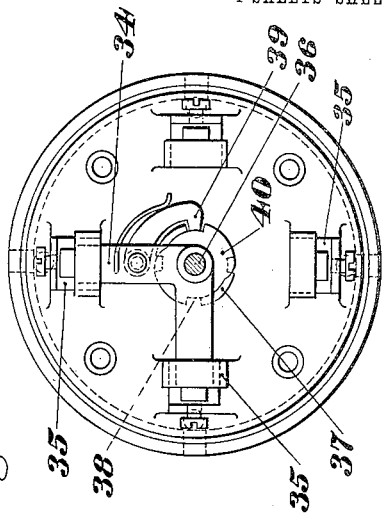
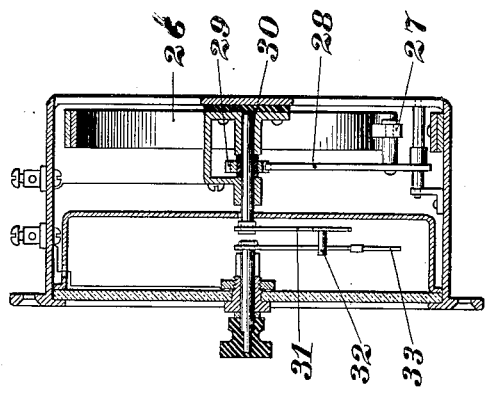
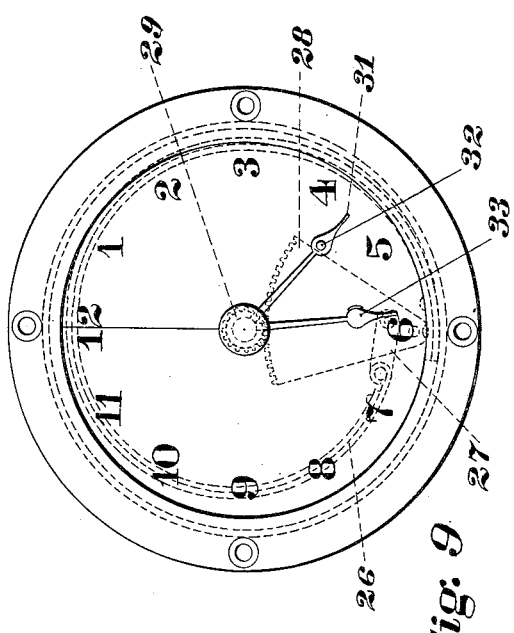
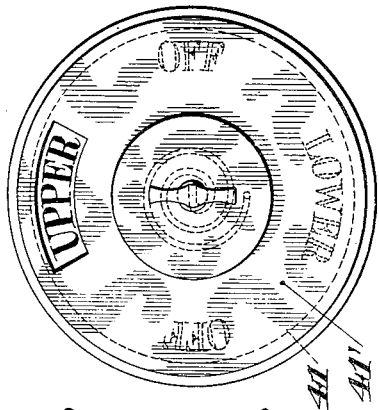
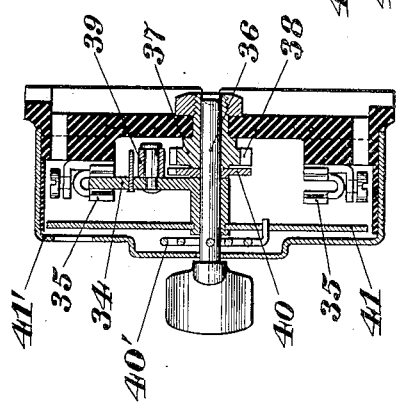
WITNESSES:
Ernest W. Davis
Albert G. McCaleb
INVENTOR:
HARRY G. WEEKS
BY Brown & Williams
ATTORNEYS

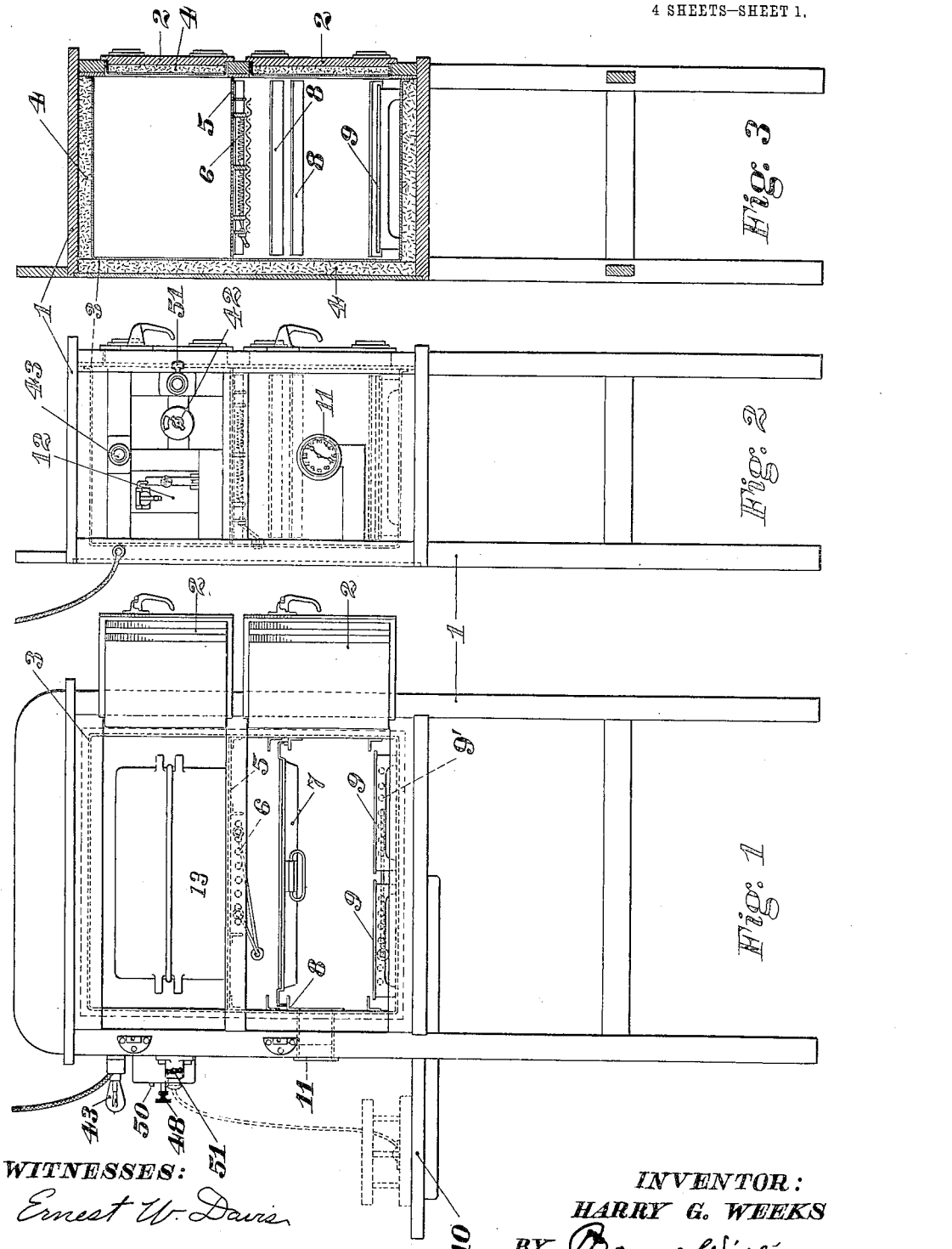

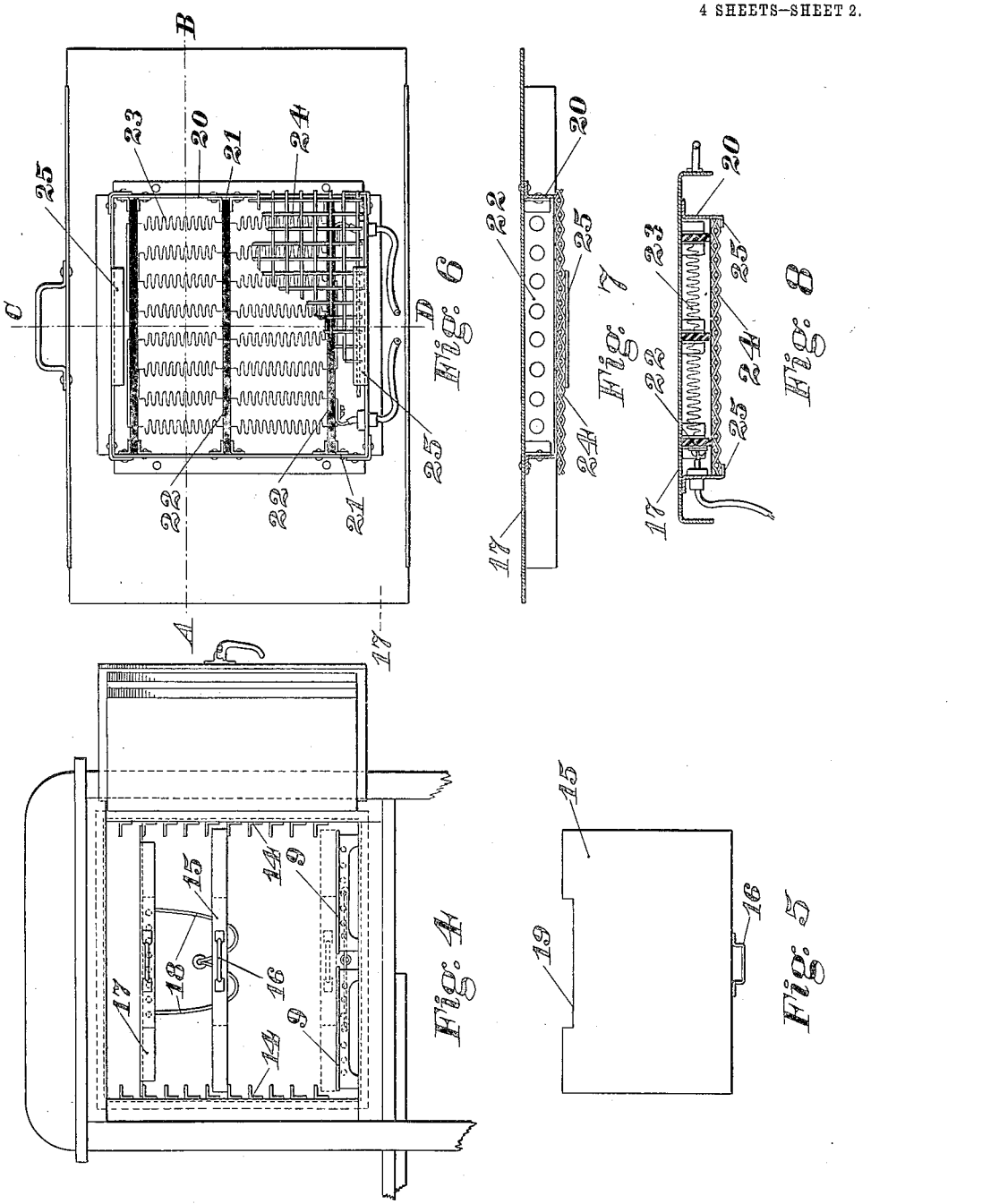

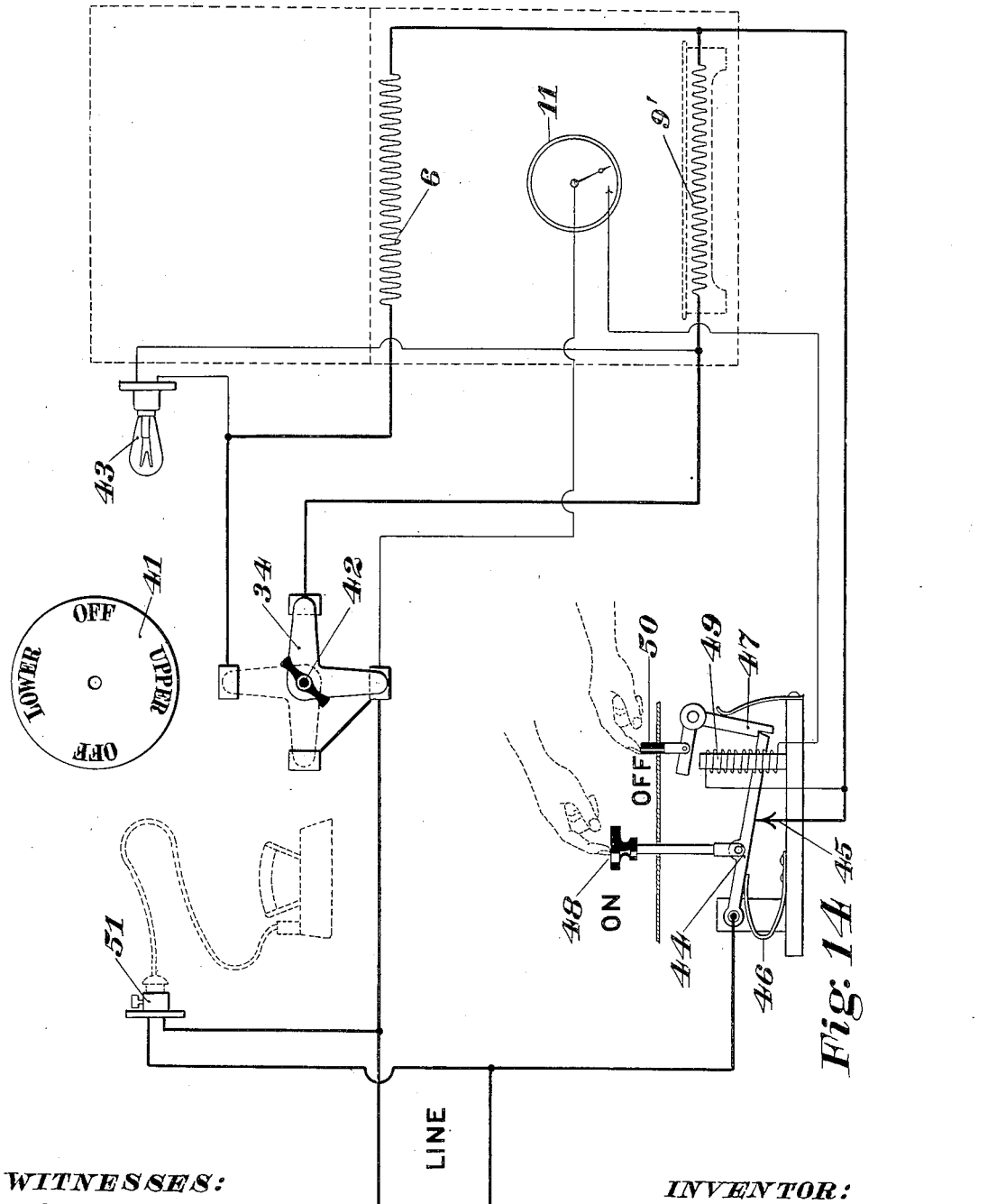

UNITED STATES PATENT OFFICE.

HARRY G. WEEKS, OF CHICAGO, ILLINOIS, ASSIGNOR TO FREDERICK C. AUSTIN, OF CHICAGO, ILLINOIS.

ELECTRIC COOKING APPARATUS.

1,118,454. Specification of Letters Patent. Patented Nov. 24, 1914.

Application filed May 6, 1911. Serial No. 625,514.

*To all whom it may concern:*

Be it known that I, HARRY G. WEEKS, a citizen of the United States, residing at Chicago, in the county of Cook and State of Illinois, have invented a certain new and useful Improvement in Electric Cooking Apparatus, of which the following is a full, clear, concise, and exact description, reference being had to the accompanying drawings, forming a part of this specification.

My invention relates to electric cooking apparatus and has for its primary object the construction of an electric stove or range adapted to carry on all of the cooking operations of the ordinary household.

The stove of my invention has been devised to create and supply the demand for an electric cooking apparatus which will be so economical of current as to make the cost of operation comparable with that of a gas stove of the same capacity.

In order to accomplish the main purposes of my invention I have devised a cabinet containing a metal lined cooking and baking compartment, which, however, is very thoroughly and effectively insulated to prevent the radiation of heat. The electric heating elements are of a size adapted to heat the cooking compartment rapidly to the proper temperature for baking or boiling, as the case may be. When the proper temperature has been attained, the current is cut off from the heating element, thus enabling the cooking to proceed after the manner of a fireless cooker. In view of the small amount of radiation, it is possible to cook a given article with a minimum expenditure of electric energy.

In order that the cooking compartment may be brought quickly to the required temperature without danger of overheating, I provide a thermostatic controller located in such a way as to be subject to the heat of the cooking compartment and arranged to control the circuit of the heating element whereby the thermostatic controller may operate automatically to shut off the current when the required temperature has been attained. The thermostatic controller preferably indicates the temperature of the cooking compartment. It is provided with means for adjusting the temperature which must be attained before the current is automatically cut off. It is possible, therefore, to set the controller to stop the flow of current at one temperature, as may be required in cooking one dish, and to shut off the current when some other temperature has been attained as may be necessary when cooking something else.

The thermostatic controller operates preferably in conjunction with an electro-magnetically controlled circuit breaker of a size adapted to break the circuit of the heating element or elements. The current required to operate the circuit breaker being small in conformity with the smaller current carrying capacity of the switch mechanism of the thermostatic controller.

Another feature of my invention resides in the arrangement of the cooking compartment or compartments. In one form of the invention I divide the main compartment into two compartments by means of a metal plate, to the lower side of which one of the heating elements is attached. This heating element is adapted to heat the plate from which it is supported, thus providing a hot plate upon which boiling may be carried on. The sides of the compartment below this heating element are provided with slides upon which a broiler may be set at the proper height. The heat radiated from the under side of the heating element is adapted in this way to broil meats laid upon the broiler. At the bottom of the lower compartment is provided also one or more hot plates, which heat the lower compartment from the bottom. These can be used for boiling, frying, etc., or can be used alone for heating the compartment, or compartments as a whole, for baking. In carrying out my invention I find it desirable to roast meats in a vessel provided with a tightly fitting cover, which prevents the escape of moisture and which returns the moisture to the roast to prevent the necessity for frequent basting. When it is desired to brown a roast, which is not sufficiently browned in such a self basting utensil, it may be put in the lower compartment which is beneath the upper heating element, where the heat of this element will strike directly upon the upper surface of the roast to be browned.

In carrying out the purposes of my invention I provide closely fitting doors which are thoroughly insulated against the conduction of heat from the cooking compartments.

One of the important features of my invention resides in the switching arrangements whereby only one or the other of the heating elements or surfaces of the cooking compartments can be supplied with current at one time. This feature is particularly important where it is desired to keep the maximum demand for cooking within a prescribed limit. If both heating elements could be supplied with current at the same time, the maximum current consumption would often be too high due to careless operation on the part of the attendant. In accordance with my invention a snap switch mechanism is provided in such a way that the current must be turned off from one element before it can be turned on to another. This, of course, limits the consumption to the current necessary to supply one heating element or the other. In conjunction with the switching mechanism I provide also a pilot signal, which indicates to the attendant whether the current is on or off the heating elements.

A bracket at the side of the stove provides a support for an additional hot plate, which may be convenient in cooking dishes which require to be stirred while heated. The hot plate is connected by a flexible cord with a socket fastened to the side of the cabinet. It is a simple matter to connect a flatiron or other electric apparatus in place of the hot plate.

A simpler form of my invention provides a single heating compartment having a heating plate or element at the bottom. A plate of soapstone or other material adapted to absorb a large amount of heat and subsequently to radiate this heat may be slipped in place immediately over the hot plate at the bottom of the compartment. When the soapstone plate has been heated it may be withdrawn and replaced in the compartment at a higher level, thus serving to heat the space between the soapstone plate and the bottom of the compartment both from above and below, as is necessary in cooking some dishes. In a single compartment stove I may use in place of the soapstone plate, or even in conjunction with it, a separate heating element comprising a metal plate with heating coils below it, the metal plate with the heating coils being adapted to be placed at various heights as may be required for the particular work in hand.

All of these and several other features of my invention will be made apparent by reference to the accompanying drawings, in which—

Figure 1 is a front elevation. Fig. 2 is an end elevation. Fig. 3 is a sectional end elevation. Fig. 4 is a partial front elevation of the simpler form of cooker having a single compartment. Fig. 5 is a plan view of the soapstone heater shown in Fig. 4. Fig 6 is a plan view of the movable electric heater shown in Fig. 4 and shows the detail construction of the heating element which is the same as the one used in the lower part of the lower compartment in Fig. 1. Fig. 7 is a sectional elevation of the same heater, the section being taken on the line A B of Fig. 6. Fig. 8 is a section on the line C D of Fig. 6. Figs. 9 and 10 are front and sectional elevations of the thermostatic controller. Fig. 11 is a sectional elevation of the snap switch. Figs. 12 and 13 are front elevations of the snap switch, the external cover or casing being removed in Fig. 13 to show the internal parts. Fig. 14 is a circuit diagram showing the arrangement and means of control of the several circuits.

The cabinet 1, Fig. 1, is preferably constructed of wood and is provided with close fitting doors 2 which prevent the escape of heated air from the interior. A metallic casing 3 is supported within the cabinet, from which it is thoroughly insulated by means of a layer 4 of asbestos, mineral wool, or other insulating substance, Fig. 3, the mechanical strength of the material being, in this form, sufficient to support the interior casing. The inner surfaces of the doors are also lined with the metal which is similarly insulated.

A metal plate 5 is mounted somewhere between the top and bottom of the cabinet which it thus divides into upper and lower compartments, in either of which cooking operations may be performed. This plate is heated by means of an electric heating arrangement 6, such as that shown in detail in Figs. 6, 7, and 8, which will be referred to specifically hereinafter. The heating elements of this arrangement are in the form of helical coils of wire, capable of attaining incandescence upon the passage of the required current, and thus transmitting heat by direct radiation. The device described may therefore be called a radiant heater to distinguish it from the conductive heaters to be described hereinafter. Some of the heat is radiated downward and some is absorbed by the plate 5 and conducted to the upper compartment. The absorption of heat by the plate 5 also produces sufficient temperature for boiling operations in the upper compartment during broiling or roasting operations in the lower compartment.

A suitable broiling pan 7 may be supported on horizontal slides 8 which permit vertical adjustment of said pan in the manner commonly employed in a gas range.

One or more heaters 9, 9, are placed at the bottom of the lower compartment. These plates are heated by coils $9^1$, $9^1$, preferably inclosed by the plates so that the heat from the coils is transmitted through the plates by conduction, thus forming heaters which will be designated hereinafter as conductive heaters to distinguish from the radiant heaters described previously. They provide means for boiling or frying by direct contact, and also heat the lower compartment by convection. The external bracket 10 is adapted to support additional cooking apparatus as described previously.

In the practical operation of the two compartments, the maximum temperature is never attained. In operating gas ovens and similar apparatus, a temperature is soon reached where the escape of heat exactly balances the amount of heat produced, but in my apparatus, the compartments are so thoroughly insulated that the heating continues to increase even during excessively high temperatures. I therefore employ a thermostat as shown at 11, which communicates with the lower compartment and which is arranged to close a circuit at a predetermined temperature, thereby actuating a circuit breaker 12 to open the circuit of the heaters. The specific construction of said thermostat and said circuit breaker and the manner in which they coöperate will be more fully explained hereinafter.

The roasting vessel 13, which is preferably of a self-basting type, may be placed either in the upper or lower compartment. In cooking a roast, the meat is placed in the roasting vessel which is then tightly covered and placed in the upper compartment. When done, or nearly so, the cover is removed and the vessel containing the roast is placed in the lower compartment, the broiling pan being removed at this time. The roast is then browned to the desired degree by the radiant heat from the heater 6.

Another form of my invention is shown in Fig. 4. This provides a single compartment having one or more heaters 9, 9 at the bottom thereof and having a plurality of slides 14 arranged at varying heights on the side walls. A plate 15 of soapstone, or other material having high specific heat, is arranged for suspension at varying heights by means of the slides 14 and is provided with a handle 16 by which it may be readily adjusted or removed. The soapstone plate is laid upon the conductive heaters 9, 9 for the purpose of heating it initially by conduction. After the soapstone plate has absorbed a sufficient amount of heat, it may be removed from the conductive heaters and replaced in the compartment at a higher level. The space between the conductive heaters 9, 9 and the soapstone 16 is then heated by their combined and mutual action, which is very advantageous in cooking some dishes.

In a single compartment stove, where broiling is to be done, a radiant electric heater 17 may be used either in place of or in conjunction with the soapstone plate. In order that current may be conducted to this heater in whatever position it is placed, flexible cords 18 are fastened to the terminals thereof. The cords 18 are preferably insulated with asbestos or other resisting insulation which is immune to heat. The soapstone plate 15 is preferably cut away at the portion 19 so as to provide clearance for the cords.

The specific construction of the radiant heating arrangements and the method of attachment to the plates is illustrated in Figs. 6, 7, and 8. The construction there shown is used in the radiant heating members in either the single or double compartment cooking apparatus shown in the drawings. A metal rectangular frame 20 is riveted or otherwise secured to the plate 17 and is provided with receptacles 21 arranged to hold insulating bars 22 which, in turn, support the helical coils 23. Since the bars are confined in the receptacles 21, they are held against longitudinal and lateral displacement. They are held against vertical displacement by means of the wire screen 24 which is supported by slides 25 formed by bending over portions of the rectangular frame 20. The wire screen 24 performs the double function of supporting the bars 22 and of providing a guard to prevent accidental contact with the heating coils 23.

The thermostat 11 consists of a band 26, Figs. 9 and 10, formed by uniting two strips of dissimilar metals having different coefficients of expansion, by virtue of which said band tends to straighten when the temperature is increased. The band 26 is arranged to transmit its motion by means of a link 27 and a segment 28 to a pinion 29 rigidly secured to a rotatable shaft 30. An indicating hand 31 is secured to the shaft 30 and is provided with a pin 32 which makes contact with an adjustable hand 33 when the band 26 reaches the temperature for which the adjustable hand is set. Such contact closes the circuit of the circuit breaker, previously referred to, and results in the opening of the circuit of the heating elements. The dial of the thermostat 11 may be inscribed the same as a clock dial, the figures of which are more easily remembered and probably of more significance to the average woman than the number of degrees Fahrenheit or centigrade.

In order to prevent over-loading the main circuit, and in order to keep the maximum current demand within prescribed limits, means is provided by which only one of the heating elements may be energized at a time. This means consists more specifically of a two-way four-point rotary snap switch having two off positions, one position for conducting current to the upper heater, and one for conducting current to the lower heater. An L-shaped switch blade 34 is arranged to revolve about the corner of the angle and makes successive connections between four radially disposed contacts 35. The shaft 36, on which the switch blade 34 revolves, rotates within a bushing 37 having a flanged circular portion provided with four peripheral notches 38, 38. A pawl or detent 39 carried by said switch blade engages in the notches 38 and thereby limits the revolution of said switch blade to 90 degrees for each operation. A cam 40 rigidly secured to the shaft 36 engages with the pawl 39 in such a manner that upon rotation of the shaft 36, through 90 degrees or a little more, the pawl 39 will be raised out of engagement with the notched bushing 37, thus permitting the switch blade 34 to move quickly to the next position under the influence of the spring $40^1$ which is placed under strong tension when the shaft rotates with the blade stationary. There the pawl 39 will engage with the next notch and thus prevent further revolution of the switch blade 34 for that actuation. An indicating disk 41 secured to and revoluble with said switch blade 34 is suitably inscribed to indicate the different positions of the switch blade, through a window in the casing $41^1$.

Referring to my general system, in the circuit diagram, Fig. 14, the two-way switch 42 is connected so as to switch current to either the upper heater 6 or to the lower heater 9. In the drawing, the full lines show the position of the switch blade 34 when current is supplied to the lower heater 9, and the dotted lines show the position occupied when current is supplied to the upper heater 6. In order to give more apparent indication of the passage of current through either of said heaters, a pilot light 43 is employed. This light is connected in the circuit with the two heating elements so that it comes in series with one of the windings and, with that winding, in shunt of the other through which the main current passes. The lamp therefore receives current when the main current is directed through either of said heating elements. When current is passed through one of the coils, the pilot light 43 is shunted across that coil with the other coil in series and as the resistance of the coils is low compared with that of the light, the latter will receive most of the energy in the shunted circuit.

The circuit breaker which was referred to hereinbefore consists of a switch bar 44 which is adapted to make connection with the contact 45 in the main circuit. A spring 46 tends to open the switch 44 which is held in its closed position by a catch 47. The switch 44 is closed manually by means of a knob 48 and is opened either by the attraction of a magnet 49 or by the manual operation of a push button 50. The circuit of said magnet 49 is established by the connection at the thermostat 11 which may be adjusted to operate the circuit breaker at a predetermined temperature as explained hereinbefore. The socket 51 is connected to the circuit as shown, and is arranged to supply current to any additional apparatus desired.

I claim:

1. In electric cooking apparatus, the combination of a heating compartment having therein a conductive electric heating member, an exposed radiant heating member also in said heating compartment, said radiant electric heating member being placed above said conductive electric heating member, and an adjustable support within said compartment adapted to carry a roast or other food to be subjected to the heat from said radiant electric heating member.

2. In electrical cooking apparatus, a heating element comprising helical coils of wire, bars of insulating material supporting said coils, a metallic plate provided with receptacles arranged to hold said bars against longitudinal and lateral displacement, a wire screen and supporting slides therefor, said bars being laid upon said screen.

3. In electric cooking apparatus, the combination of a heating chamber, a heat-conducting partition suspended at approximately the center of said chamber and dividing said chamber into upper and lower compartments each adapted for the reception of articles to be cooked, and an electric heater near the top of said lower compartment whereby said upper compartment is heated by conduction through said partition and said lower compartment is heated by direct radiation from said heater.

4. In electric cooking apparatus, the combination of a conductive electric heating member, a coreless radiant electric heat and light coil, said radiant electric heating coil being placed above said conductive heating member, and a space between said heating member and said coil adapted to receive foods to be cooked.

5. In electric cooking apparatus, the combination of a conductive electric heating member, a luminous radiant electric heating member, said radiant electric heating member being placed above said conductive heating member, and a space between said heating members adapted to receive foods to be cooked.

6. In electric cooking apparatus, a chamber, a plate supported in said chamber, a screen supported from said plate at a distance below it, a plurality of insulating bars laid upon said screen, and electric heating coils supported upon said insulating bars.

7. In electric cooking apparatus, a chamber, a plate supported in said chamber, a screen supported from said plate at a distance below it, a plurality of insulating bars laid upon said screen, and electric heating coils supported upon said insulating bars, said bars fitting tightly between said plate and said screen.

8. In electric heating apparatus, a chamber, a conductive electric heater disposed in said chamber, a radiant electric heater disposed in said chamber, a switch having contacts respectively connected with said conductive electric heater and said radiant electric heater, and a switch plate arranged to close only one of the circuits at a time and thus insisting upon alternate connection.

9. In an electric cooking apparatus, a chamber, an electric heater disposed in one part of said chamber, an electric heater disposed in another part of said chamber, a switch having contacts respectively connected with said heaters, and a movable switch element arranged to close only one circuit at a time thus insisting upon alternate connection.

10. In electric cooking apparatus, the combination of upper and lower compartments each adapted for the reception of articles to be cooked, a conductive electric heater at the bottom of said lower compartment, a radiant electric heater comprising exposed coils at the top of said lower compartment, and adjustable devices for supporting a roast to be subjected to the radiant heat of said radiant electric heater.

11. In electric cooking apparatus, the combination of upper and lower compartments each adapted for the reception of articles to be cooked, a conductive electric heater at the bottom of said lower compartment, and a radiant electric heater comprising luminous exposed coils at the top of said lower compartment, there being a compartment between said heaters adapted to receive foods to be cooked.

12. In electric cooking apparatus, a chamber, an electric heating device in said chamber, a shelf extending from said chamber, an electric heating device on said shelf, a circuit for one of said electric heating devices, and electrical connections for the other electric heating device bridged across said circuit.

13. In a cooking apparatus, the combination of an oven, a primary heater adapted to be supported therein and have an open utensil for food placed thereon to receive heat therefrom by conduction, and a second primary heater adapted to be suspended in close proximity to the open part of said receptacle and adapted to radiate heat for cooking the food, said second heater having its under face open so as to expose the heating element therein for promoting the radiation of heat to the food.

In witness whereof, I hereunto subscribe my name this 27th day of April, A. D. 1911.

HARRY G. WEEKS.

Witnesses:
ARTHUR H. BOETTCHER,
ALBERT G. MCCALEB.